United States Patent [19]

Tylkowski

[11] Patent Number: 5,035,074
[45] Date of Patent: Jul. 30, 1991

[54] TIP-UP POLE AND/OR ICE FISHING EYELETS

[76] Inventor: Larry B. Tylkowski, 28631 W. Benjamin Ave., Spring Grove, Ill. 60081

[21] Appl. No.: 398,589
[22] Filed: Aug. 25, 1989
[51] Int. Cl.⁵ .............................................. A01K 87/04
[52] U.S. Cl. ...................................................... 43/24
[58] Field of Search .............................................. 43/24

[56] References Cited
U.S. PATENT DOCUMENTS
2,855,717 10/1958 Heil ........................................ 43/24
3,210,881 10/1965 Wilson ................................... 43/24

Primary Examiner—Kurt Rowan
Attorney, Agent, or Firm—Charles F. Meroni, Jr.

[57] ABSTRACT

In a tip-up fishing pole for ice fishing having handle and pole segments in assembly together. A series of open ended eyelets. Fasteners attaching one end of each of the eyelets at spaced intervals on the pole segment. Each of the open ended eyelets being loop-shaped and having an outwardly bent free end spaced from the pole segment leaving a gap there between allowing a fisherman to pick up a hand line unattached to a fishing pole and to drape the line through the gaps between the free ends of the loop-shaped open ended eyelets and the pole to allow a fisherman to quickly use a pole to assist in setting a baited fishing hook in the event a fish strikes the baited hook on a hand line.

6 Claims, 1 Drawing Sheet

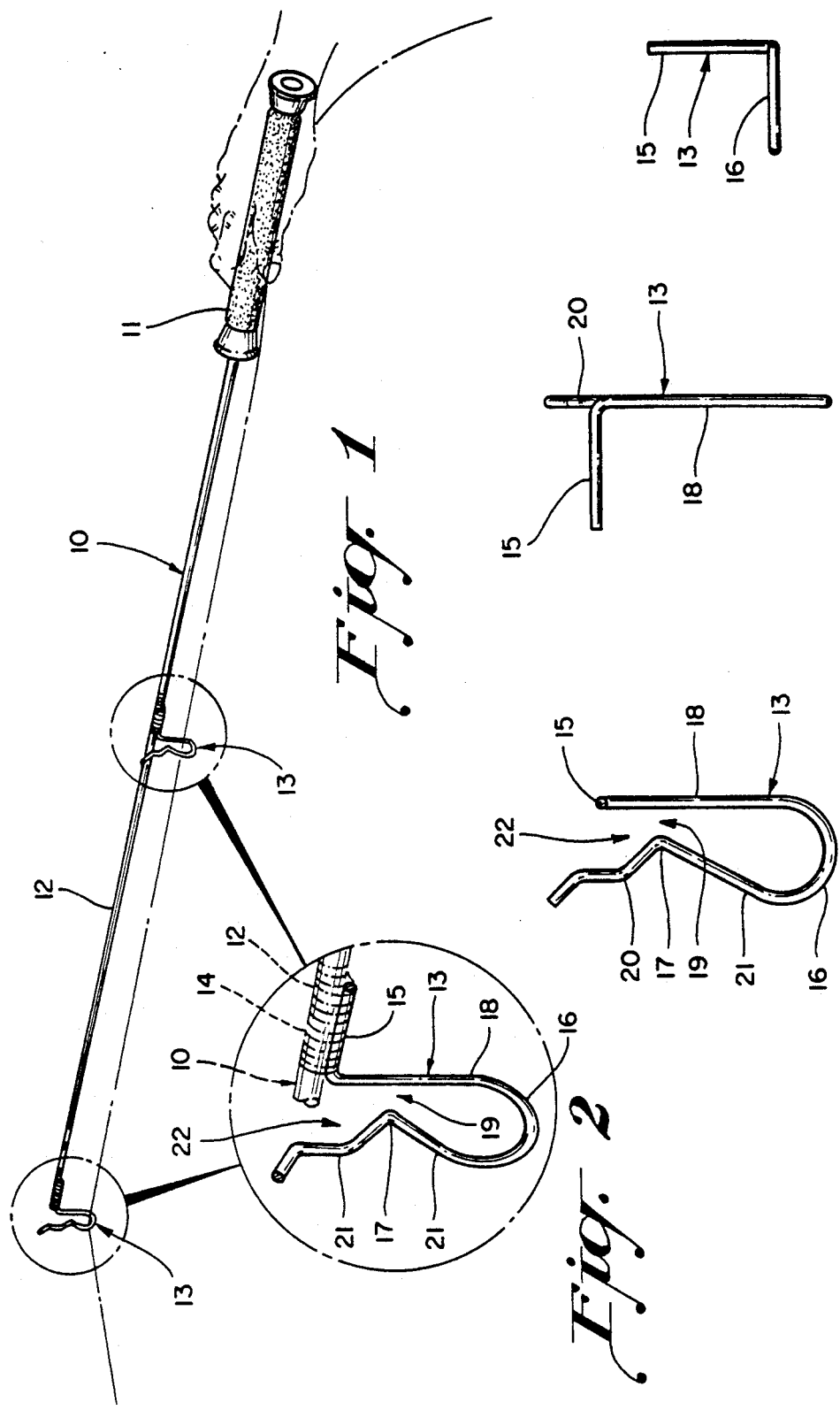

TIP-UP POLE AND/OR ICE FISHING EYELETS

BACKGROUND OF THE INVENTION

My devices have been used in part for ice fishing. One such device is one where an ice fisherman will set the device over a precut ice hole after he has baited the hook with a minnow. The fishing line runs off of a reel that is located on the bottom side of the tip-up device, and is supported on an upstanding shaft. A trigger mechanism is provided whereby when a fish hits the bait, the fish then starts to move the bait, the line unreels off of the reel, and the flag on the top side of Beaver Dam "Tip-Up" apparatus swings into an upstanding position signaling to the fisherman that a fish in running with the bait.

The upstanding post that was previously described as a shaft is tubular in nature and internally thereof is a solid shaft that is fixedly connected to the reel at the bottom end. As the reel is unreeled the interior shaft rotates. The top end of the shaft extends through the base plate of the "tip-up" mechanism above the ice so that the fisherman can see this shaft as it rotates to inform the fisherman that the fish is moving the bait away from where it was originally located.

In the past, when a fish is on a line, the fisherman would then pick up the entire apparatus and attempt to set the line by yanking the line gently to try to set the hook into the fish.

My new pole has been provided with special eyelets embodying important features of my invention to assist the fisherman in setting the line. In the past, many fish have been lost because in the process of setting the line, the line would break. Another problem that exists with the commonly used tip-ups is that the fisherman will employ a heavier line, and with a heavier line apparently there are fewer strikes by the fish.

Now according to my invention, a six pound test line can be used rather than a fifteen test line, and such lighter line can be more effectively used than with the heavier line.

The new pole embodying my invention can be used by the fisherman in such a way that after the fish is noted to have taken the bait, the fisherman will then lift up the Beaver Dam "Tip-up" and allow a little slack to flow and then engage the open ended eyelets of the fishing pole with the line and at the same time manually grasp an end of the line in adjacency to the handle of the pole in a rather loose sort of a way so that line can still be allowed to move with the fish should the fish require or demand further line. At this point in time, the fisherman is then in a position where he can attempt to set the hook in the fish either in a kneeling or standing position as he may wish. By employing this type of a procedure, the fisherman obtains the benefit of a fishing pole and the spring action of a fishing pole, and the lighter touch of a fishing pole all as aids in setting the line with less chance for breaking the line off at the time when the bait is set into the fish.

After the fish has been hooked, the rod can be used in the same way as a fly rod. To this end, the fisherman can manually retrieve the line along the length of the pole in a hand over hand fashion to draw the bait, hook and fish towards the fisherman and ultimately through the ice hole and thereby land the fish.

SUMMARY OF INVENTION

In a tip-up fishing pole for ice fishing having handle and pole segments in assembly together, the improvement comprising a series of open ended eyelets, means attaching one end of each of said eyelets at spaced intervals on said pole segment, and each of said open ended eyelets being loop-shaped and having an outwardly bent free end spaced from said pole segment leaving at all times an open end gap there between allowing a fisherman to pick up a hand line unattached to a fishing pole and to drape the line through the gaps between the free ends of the loop-shaped open ended eyelets and the pole to allow a fisherman to quickly use a pole to assist in setting a baited fishing hook in the event a fish strikes the bated hook on a hand line, the open ended eyelets each being generally U-shaped in configuration and having a narrowed neck, said neck being located between opposite ends of the U-shape of the neck and a bottom of the U to aid in prevention of accidental dislodgement of a fishing line from the eyelets.

According to further features of my invention, the the open ended eyelets each being generally U-shaped in configuration and having a narrowed neck, said neck being located between opposite ends of the U-shape of the neck and a bottom of the U to aid in prevention of accidental dislodgement of a fishing line from the eyelets.

Yet other features of my invention concern new and improved eyelets having the outwardly bent free end outwardly bent free end being outwardly flared enlarging the distance between opposite ends of the U to make it easier to thread a fishing line between the ends of the loop-shaped eyelet.

Yet other features of my invention concern a new and improved combination of a tip-up fishing pole for ice fishing having handle and pole segments in assembly together and a series of open ended loop-shaped eyelets with means attaching the eyelets to the pole.

BRIEF DESCRIPTION OF THE DRAWINGS

Further features, objects and advantages of the invention will be found throughout the following more detailed description which refers to the accompanying drawings, disclosing several embodiments, wherein:

FIG. 1 is a perspective view of my tip-up ice pole and/or ice fishing eyelets with a hand illustrated in dotted lines showing the way in which a fisherman can thread a fishing line through the eyelets and use the pole;

FIG. 2 is an enlarged fragmentary perspective view of the pole shown in FIG. 1 illustrating the way in which the ice fishing eyelet is attached to a fishing pole;

FIG. 3 is a side view of my eyelet embodying important features of my invention;

FIG. 4 is an edge view of the eyelet shown in FIG. 3 illustrating other features of my invention; and FIG. 5 is a top plan view of my ice fishing eyelet.

DESCRIPTION OF THE PREFERRED EMBODIMENT

Referring now to the drawing, I have indicated my tip-up fishing pole with the reference numeral 10. This pole is for ice fishing and it has handle and pole segments 11 and 12. These segments can be permanently attached together or they can be secured in and constructed as to be in knockdown assembly in accordance with the usual pole construction techniques that have been in use for many years.

According to my invention, I have provided a series of open ended loop-shaped eyelets 13. The eyelets 13 can be comprised of any suitable material, such as galvanized steel wire. Attachment means in the form of ties or pieces of line 14 are used for attaching offset end 15 to the pole as shown in FIG. 1. The ties 15 are of a conventional type, and are well-known by fishermen. Any suitable number of the eyelets 13 can be attached to the pole, and in the illustrated form of my invention I have shown two eyelets secured to the pole segment 12 by the ties 15.

Each of the eyelets 13 is of a generally U-shaped open ended or loop-shaped construction. The loop-shaped eyelet portion has been indicated generally at 16. The loop-shaped eyelet portion 16 is connected to an inwardly indented eyelet portion 17 which operates to co-act with opposite leg 18 of the eyelet to provide a reduced neck area or reduced gap area indicated generally at 19. The open ended eyelet 13 is further provided with an S-shaped outwardly bent free end 20, and to this extent the free end 20 extends beyond the attachment end 15 of the eyelet provided on the opposite leg 18 of the eyelet. Thus, the eyelet 13 has two legs 18 and 21 and the portions 17 and 20 are provided on the leg 21 while the other leg 18 has the outwardly bent attachment end 15 which is tied to the pole by the line attachment means 15 as previously described.

While the gap between the legs 18 and 21 is narrow at 19 to prevent the line from being readily disengaged from the eyelet after it has been draped and placed there by a fisherman, the eyelet 13 also has a wider gap as indicated at 22 to assist and allow the fisherman to quickly line up the line with the open end and with the gap 22 of the eyelet 13 so that the line can be quickly and easily positioned within the eyelets so that a fisherman can use the pole to assist him in setting a baited fishing hook in the event a fish strikes the baited hook on a hand line.

As various possible embodiments may be made in the above invention for use for different purposes and as various changes might be made in the embodiments and method above set forth, it is understood that all of the above matters here set forth or shown in the accompanying drawings are to be interpreted as illustrative and not in a limiting sense.

I claim:

1. In a tip-up fishing pole for ice fishing having handle and pole segments in assembly together, the improvement comprising a series of open ended eyelets, means attaching one end of each of said eyelets at spaced intervals on said pole segment, and each of said open ended eyelets being loop-shaped and having an outwardly bent free end spaced from said pole segment leaving at all times an open end gap there between allowing a fisherman to pick up a hand line unattached to a fishing pole and to drape the line through the gaps between the free ends of the loop-shaped open ended eyelets and the pole to allow a fisherman to quickly use a pole to assist in setting a baited fishing hook in the event a fish strikes the baited hook on a hand line, the open end eyelets each being generally U-shaped in configuration and having a narrowed neck, said neck being located between opposite ends of the U-shape of the neck and a bottom of the U to aid in prevention to accidental dislodgement of a fishing line from the eyelets.

2. The pole of claim 1 wherein the outwardly bent free end is outwardly flared enlarging the distance between opposite free ends of the U to make it easier to thread a fishing line between the ends of the loop-shaped eyelet.

3. In combination, a reel-less tip-up fishing pole for ice fishing with a tip up device having a flag indicator and a reel on its underside for submersion in water while fishing, the pole having handle and pole segments in assembly together, and a series of open ended loop shaped eyelets, means attaching one end of each of said eyelets at spaced intervals on said pole segment, and each of said open ended eyelets having an outwardly bent free end spaced from the pole segment leaving at all times an open end gap there between allowing a fisherman to pick up a hand line unattached to a fishing pole and to drape the line through the gaps between the free ends of the loop-shaped open ended eyelets and the pole to allow a fisherman to quickly use a pole to assist in setting a baited fishing hook in the event a fish strikes the baited hook on a hand line, the open ended eyelets each being generally U-shaped in configuration and having a narrowed neck, said neck being located between opposite ends of the U-shape of the neck and a bottom of the U to aid in prevention of accidental dislodgment of a fishing line from the eyelets.

4. The pole of claim 3 wherein the outwardly bent free end is outwardly flared enlarging the distance between opposite free ends of the U to make it easier to thread a fishing line between the ends of the loop-shaped eyelet.

5. In a reel-less fishing pole for ice fishing having handle and pole segments in assembly together, the improvement comprising a series of open ended eyelets, means attaching one end of each of said eyelet at spaced intervals on said pole segment, and each of said open ended eyelets being loop-shaped and having an outwardly bent free end spaced from said pole segment leaving at all times an open end gap there between allowing a fisherman to pick up a hand line unattached to a fishing pole and to drape the line through the gaps between the free ends of the loop-shaped open ended eyelets and the pole to allow a fisherman to quickly use a pole to assist in setting a baited fishing hook in the event a fish strikes the baited hook on a hand line, the open ended eyelets each being generally U-shaped in configuration and having a narrowed neck, said neck being located between opposite ends of the U-shaped of the neck and a bottom of the U to aid in prevention of accidental dislodgement of a fishing line from the eyelets, the U-shaped eyelets including a straight leg positioned in spaced confronting relation to said narrowed neck for allowing a fishing line to slide there along past the neck and into the bottom of the U to aid in lodgment of the line in the associated eyelet to facilitate use of the fishing pole by the fisherman.

6. The pole of claim 5 wherein the outwardly bent free end is outwardly flared enlarging the distance between opposite free ends of the U to make it easier to thread a fishing line between the ends of the loop-shaped eyelet.

* * * * *